United States Patent
Aoki et al.

[11] Patent Number: 5,107,711
[45] Date of Patent: Apr. 28, 1992

[54] TORQUE SENSOR

[75] Inventors: Hiroyuki Aoki, Kanagama; Shinichiro Yahagi; Takanobu Saito, both of Aichi, all of Japan

[73] Assignees: Nissan Motor Company, Limited; Daidotokushuko Kabushikigaisha, both of Nagoya, Japan

[21] Appl. No.: 319,351

[22] Filed: Mar. 6, 1989

[30] Foreign Application Priority Data

| Mar. 4, 1988 | [JP] | Japan | 63-50819 |
| Mar. 4, 1988 | [JP] | Japan | 63-50820 |
| Mar. 17, 1988 | [JP] | Japan | 63-61768 |
| Mar. 30, 1988 | [JP] | Japan | 63-74822 |
| Apr. 7, 1988 | [JP] | Japan | 63-84022 |

[51] Int. Cl.$^5$ .............................. G01L 3/10
[52] U.S. Cl. .............................. 73/862.36
[58] Field of Search .............. 73/862.36, DIG. 2

[56] References Cited

U.S. PATENT DOCUMENTS

| 4,506,554 | 3/1985 | Blomkvist et al. | 73/862.36 |
| 4,760,745 | 8/1988 | Garshelis | 73/862.36 |
| 4,762,008 | 8/1988 | Kobayashi et al. | 73/862.36 |
| 4,765,192 | 8/1988 | Hase et al. | 73/862.35 |
| 4,823,617 | 4/1989 | Hase et al. | 73/862.36 |
| 4,840,073 | 6/1989 | Aoki et al. | 73/862.36 |

FOREIGN PATENT DOCUMENTS

| 59-61730 | 4/1984 | European Pat. Off. |
| 0138086 | 4/1985 | European Pat. Off. |
| 0162957 | 12/1985 | European Pat. Off. |
| 0261980 | 3/1988 | European Pat. Off. |

*Primary Examiner*—Charles A. Ruehl
*Attorney, Agent, or Firm*—Foley & Lardner

[57] ABSTRACT

A torque sensor provides a specific property for a shaft member so as to improve sensitivity and so as to minimize hysteresis in measurement of the torque exerted thereon. The shaft member is provided specific composition achieving the desired level of sensitivity without increasing the hysteresis. In the alternative, the shaft member is processed in order to provide the desired property.

14 Claims, 4 Drawing Sheets

TORQUE SENSOR

BACKGROUND OF THE INVENTION

1. Field of the Invention

The present invention relates generally to a torque sensor for monitoring torque exerted on a shaft or axle of an object. More specifically, the invention relates to a magnetostriction type torque sensor.

2. Description of the Background Art

A typical construction of a magnetostriction type torque sensor, known in the prior art, generally comprises a shaft member to measure torque exerted thereto, and an electromagnetic coil provided in the proximity of the shaft, defining a small gap between the opposing surfaces, and having a yoke made of material having a high permeability material, such as permalloy. A magnetic field is thus generated around the shaft by energizing the electromagnetic coil for monitoring magnetostriction component by means of a detector coil, which is also wound on the yoke.

In the practical measurement of torque exerted on the shaft member, electric power is supplied to the electromagnetic coil. The energized electromagnetic coil generates magnetic flux between the shaft and the yoke to form a magnetic circuit. The detector coil is placed in the magnetic circuit. The permeability of the shaft member is variable depending upon the magnetostriction therein. Therefore, the density of the magnetic flux to be detected by the electric power induced in the detector coil varies depending upon the magnetostriction in the shaft member.

If such a magnetostriction type torque sensor is used for monitoring torque exerted on an axle in an automotive power train, such as a drive shaft, a column shaft, etc., the variation of the generated power in the detector coil tends to become smaller than that required for accurate measurement. Namely, the axle in the power train is generally formed of steel for machine structural use, such as that produced according to JIS SC, SCr, SCM, SNCM and so forth. Such an axle is provided high strength in order to have low sensitivity to variations of the exerted torque. Therefore, the sensitivity of the torque sensor becomes too low to expand hysteresis range for lowering accuracy in measurement of the measured torque.

SUMMARY OF THE INVENTION

Therefore, it is an object of the present invention to provide a torque sensor which overcomes the aforementioned problems in the prior art and which can provide high accuracy in the measurement of an exerted torque even when it is applied to an axle or a shaft made of steel for mechanical structural use.

In order to accomplish the aforementioned object and other objects, a torque sensor, according to the present invention, provides a specific property for a shaft member so as to improve sensitivity and to minimize hysteresis in the measurement of torque exerted thereon. The shaft member is provided a specific composition achieving the desired level of sensitivity without increasing the hysteresis. Alternatively, the shaft member is processed in a treatment, which provides the desired property.

According to one aspect of the invention, a torque sensor for monitoring torque exerted on a shaft member, comprises:

means for generating magnetic flux for forming a magnetic circuit extending through a predetermined portion of the shaft member;

means for monitoring magnetostriction in the shaft member for producing a torque indicative signal having a value variable depending upon the magnetostrictions; and the shaft member being made of a steel having a following composition at least at the predetermined portion, C: 0.25 to 1.5 Wt. %;
Si: less than or equal to 1.0 Wt %;
Mn: less than or equal to 2.0 Wt %;
Ni: less than or equal to 5.0 Wt % and/or
Cr: less than or equal to 5.0 Wt %; and
remaining content of Fe and inevitable impurity.

The steel may further contain one or more materials selected from the following materials:

Pb: less than or equal to 0.5 Wt %;
Bi: less than or equal to 0.5 Wt %;
S: less than or equal to 0.5 Wt %;
P: less than or equal to 0.3 Wt %;
Te: less than or equal to 0.5 Wt %;
Se: less than or equal to 0.5 Wt %; and
Ca: less than or equal to 0.05 Wt %.

The steel may further contain one or more materials selected from the following materials:

Cu: less than or equal to 1.0 Wt %;
Mo: less than or equal to 1.0 Wt %;
B: less than or equal to 0.05 Wt %;
W: less than or equal to 0.5 Wt %;
V: less than or equal to 0.5 Wt %;
Ti: less than or equal to 0.5 Wt %;
Nb: less than or equal to 0.5 Wt %;
Ta: less than or equal to 0.5 Wt %;
Zr: less than or equal to 0.5 Wt %;
Hf: less than or equal to 0.5 Wt %;
Al: less than or equal to 0.1 Wt %; and
N: less than or equal to 0.1 Wt %.

According to another aspect of the invention, a torque sensor for monitoring torque exerted on a shaft member, comprises:

means for generating magnetic flux for forming a magnetic circuit extending through a predetermined portion of the shaft member;

means for monitoring magnetostriction in the shaft member for producing a torque indicative signal having a value variable depending upon the magnetostriction; and the shaft member being made of a steel having a following composition at least at the predetermined portion, C: 0.1 to 1.5 Wt %;
Si: 0.5 Wt % to 4.0 Wt %;
Mn: less than or equal to 3.0 Wt %;
Al: less than or equal to 3.0 Wt %;
Ni: less than or equal to 5.0 Wt % and/or
Cr: less than or equal to 5.0 Wt %; and
remaining content of Fe and inevitable impurity.

The steel may further contain one or more materials selected from the following materials, Pb: less than or equal to 0.5 Wt %;
Bi: less than or equal to 0.5 Wt %;
S: less than or equal to 0.5 Wt %;
P: less than or equal to 0.3 Wt %;
Te: less than or equal to 0.5 Wt %;
Se: less than or equal to 0.5 Wt %; and
Ca: less than or equal to 0.05 Wt %.

The steel may further contain one or more materials selected from the following materials:
Cu: less than or equal to 1.0 Wt %;
Mo: less than or equal to 1.0 Wt %;
B: less than or equal to 0.05 Wt %;
W: less than or equal to 0.5 Wt %;
V: less than or equal to 0.5 Wt %;
Ti: less than or equal to 0.5 Wt %;
Nb: less than or equal to 0.5 Wt %;
Ta: less than or equal to 0.5 Wt %;
Zr: less than or equal to 0.5 Wt %;
Hf: less than or equal to 0.5 Wt %;
N: less than or equal to 0.1 Wt %.

According to a further aspect of the invention, a torque sensor for monitoring torque exerted on a shaft member, comprises:

means for generating magnetic flux for forming a magnetic circuit extending through a predetermined portion of the shaft member;

means for monitoring magnetostriction in the shaft member for producing a torque indicative signal having a value variable depending upon the magnetostriction; and the shaft member being made of a steel having a following composition at least at the predetermined portion,
C: 0.1 to 1.5 Wt %;
Si: less than or equal to 4.0 Wt %;
Mn: less than or equal to 3.0 Wt %;
Al: less than or equal to 3.0 Wt %;
Co: less than or equal to 5.0 Wt %;
Ni: less than or equal to 5.0 Wt % and/or
Cr: less than or equal to 5.0 Wt %; and
remaining content of Fe and inevitable impurity.

The steel may further contain one or more materials selected from the following materials:
Pb: less than or equal to 0.5 Wt %;
Bi: less than or equal to 0.5 Wt %;
S: less than or equal to 0.5 Wt %;
P: less than or equal to 0.3 Wt %;
Te: less than or equal to 0.5 Wt %;
Se: less than or equal to 0.5 Wt %; and
Ca: less than or equal to 0.05 Wt %.

The steel may further contain one or more materials selected from the following materials:
Cu: less than or equal to 1.0 Wt %;
Mo: less than or equal to 1.0 Wt %;
B: less than or equal to 0.05 Wt %;
W: less than or equal to 0.5 Wt %;
V: less than or equal to 0.5 Wt %;
Ti: less than or equal to 0.5 Wt %;
Nb: less than or equal to 0.5 Wt %;
Ta: less than or equal to 0.5 Wt %;
Zr: less than or equal to 0.5 Wt %;
Hf: less than or equal to 0.5 Wt %;
N: less than or equal to 0.1 Wt %.

According to a still further aspect of the invention, a torque sensor for monitoring torque exerted on a shaft member, comprising:

means for generating magnetic flux for forming a magnetic circuit extending through a predetermined portion of the shaft member;

means for monitoring magnetostriction in the shaft member for producing a torque indicative signal having a value variable depending upon the magnetostriction; and the shaft member being made of a steel containing 11.0 Wt % to 15.0 Wt % of Al at least at the predetermined portion.

The steel may further contain total content 0.01 Wt % to 5.0 Wt % of one or two materials selected among B, Si, Ge, Sn, Pb, P, Sb, Cu, Ni, Co, Mn, Cr, Mo, W, V, Nb, Ta, Ti, Zr, Hf, Be, Sc, Y and other rare earth metal and substantially remaining content of Fe. The steel may further contain 0.01 Wt % to 0.50 Wt % of C.

According to a yet further aspect of the invention, a torque sensor for monitoring torque exerted on a shaft member, comprises:

means for generating magnetic flux for forming a magnetic circuit extending through a predetermined portion of the shaft member;

means for monitoring magnetostriction in the shaft member for producing a torque indicative signal having a value variable depending upon the magnetostriction; and the shaft member being made of a steel containing 11.0 Wt % to 15.0 Wt % of Al at least at the predetermined portion, the steel being subject heat treatment for cooling from a temperature higher than or equal to 500° C. to a cooling speed higher than or equal to 500° C./hr.

The steel may further contain total content 0.01 Wt % to 5.0 Wt % of one or two materials selected among B, Si, Ge, Sn, Pb, P, Sb, Cu, Ni, Co, Mn, Cr, Mo, W, V, Nb, Ta, Ti, Zr, Hf, Be, Sc, Y and other rare earth metal and substantially remaining content of Fe. The steel may further contain 0.01 Wt % to 0.50 Wt % of C.

According to a further aspect of the invention, a torque sensor for monitoring torque exerted on a shaft member, comprises:

means for generating magnetic flux for forming a magnetic circuit extending through a predetermined portion of the shaft member;

means for monitoring magnetostriction in the shaft member for producing a torque indicative signal having a value variable depending upon the magnetostriction; and at least the predetermined portion of the shaft member having a property satisfying one of the following conditions (A) to (C):

(A) saturated magnetostriction $\lambda s$ satisfies:

$$0.5 \times 10^{-6} \leq |\lambda s| \leq 15 \times 10^{-6}$$

(B) ratio between saturated magnetostriction and crystalline magnetic anisotropy coefficient $K_1$ (J/m³) satisfies:

$$|K_1/\lambda s| \geq 6 \times 10^8 (K/m^3);$$

an elastic limit $\tau_E$ (Kgf.mm²) versus twisting stress can satisfy:

$$\tau_E \geq 20(\text{Kgf.mm}^2)$$

0.2% yield point $\tau_{0.2}$ (Kgf.mm²) to twisting stress can satisfy:

$$\tau_{0.2} \geq 40(\text{Kgf.mm}^2)$$

and (C) a holding capacity Hc (Oe) of the magnetic force can satisfy:

$$5(\text{Oe}) \leq Hc \leq 50(\text{Oe})$$

and/or the initial permeability $\mu_i$ is in a range of:

$$10 \leq \mu_1 \leq 100$$

and the maximum permeability $\mu_m$ is in a range of:

$$50 \leq \mu_m \leq 250.$$

BRIEF DESCRIPTION OF THE DRAWINGS

The present invention will be understood more fully from the detailed description given below and from the accompanying drawings of the preferred embodiment of the invention, which should not be taken to limit the invention to the specific embodiment but are for explanation and understanding only.

In the drawings.

DESCRIPTION OF THE PREFERRED EMBODIMENT

Figure 1:
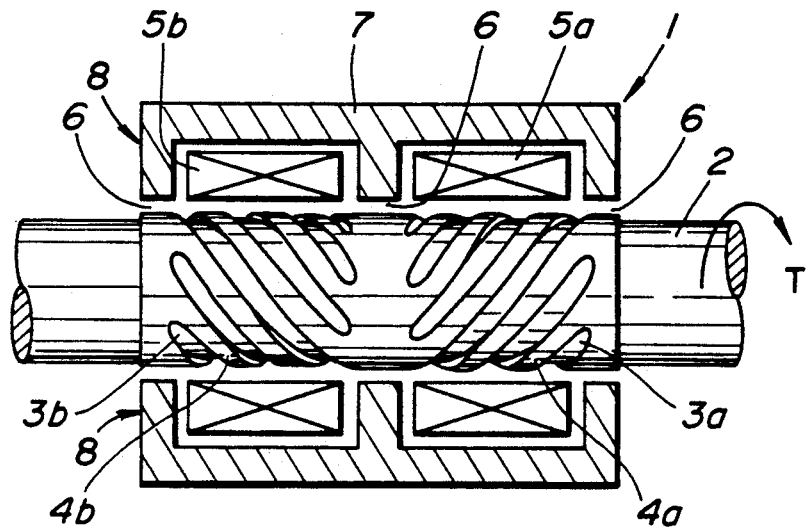
FIG. 1 is a section of the preferred embodiment of a torque sensor according to the present invention.

Referring now to the drawings and particularly to FIG. 1, the preferred embodiment of a torque sensor unit 1, according to the present invention, comprises a shaft member 2 about which an exerted torque is to be measured, and a sensor assembly 8. The shaft member 2 is formed with tilted grooves 3a and 3b which are tilted with respect to the axis of the shaft member at a predetermined angle, e.g. 45°. The tilting directions of the grooves 3a and 3b are opposite to each other so that anisotropy is provided between the sections of the grooves 3a and 3b. The tilted grooves 3a and 3b are separated by lands 4a and 4b extending in tilted fashion between the grooves.

The sensor assembly 8 comprises a pair of annular coils 5a and 5b, arranged in opposition to the section where the grooves 3a and 3b are provided. The coils 5a and 5b are received on a yoke 7 having an magnetically separating annular projection 6 extending from the position intermediate between coil receptacle portions for receiving the coils 5a and 5b. The yoke 7 is formed of a material with a high permeability.

The coils 5a and 5b form a bridge circuit together with resistors 11 and 12. A variable resistor 13 for balancing is also disposed between junctions B and B' between the coil 5a and the resistor 11 and between the coil 5b and the resistor 12. Junctions A and C respectively between the coils 5a and 5b and between the resistors 11 and 12 are connected to an oscillator 14. The oscillator 14 is designed to energize the coils 5a and 5b by an oscillating frequency signal. The junctions B and B' are connected to a differential amplifier 15. The differential amplifier 15 is designed to output a signal indicative of the monitored torque through output terminals 16 and 17.

The coils 5a and 5b are energized by the signal supplied by the oscillator 14, generating a magnetic flux extending through the associated portions of the shaft member 2, for which associated portions of the grooves 3a and 3b are used to form magnetic circuits. In the shown embodiment, the coils 5a and 5b serve as the electromagnetic coils for forming these magnetic circuits and the detector coils for detecting variation of permeability in the associated portions.

In the practical operation of monitoring torque to be exerted on the shaft member 2, the oscillator 14 supplies a signal of constant amplitude (V) and constant frequency (f) to the coils 5a and 5b. Consequently, the coils 5a and 5b generate magnetic flux therearound. The magnetic flux generated by the coils forms a magnetic loop circuit extending the gap between the yoke 7 and the shaft member 2, and the grooved portions 3a, 3b of the shaft member. Because the power applied to the coils 5a and 5b is alternating current, eddy currents are induced in the shaft member. The level of the eddy currents may be increased by increasing the frequency of the signal applied to the coils 5a and 5b. The magnitude of eddy currents is maximum at the radial center of the shaft member and zero at the external surface. Therefore, the magnetization at the surface can follow variations of the magnetic field. However, variations of magnetization at the center is prevented by the strong eddy currents.

Therefore, the magnetic flux generated by coils 5a and 5b flows through the surface of the shaft member. For the magnetic flux flowing on the surface of the shaft member 2, the grooves 3a and 3b serve as a resistance so that the area of flow of the magnetic flux is generally limited to the lands 4a and 4b defined between adjacent grooves 3a and 3b, respectively. Therefore, configuration and tilting angle of the grooves 3a and 3b and the lands 4a and 4b substantially influences anisotropy.

As shown in FIG. 1, the tilting directions of the grooves 3a and 3b and the lands 4a and 4b are opposite to each other with equal tilting angle with respect to the axis of the shaft member 2. The best tilting angle is selected at an angle corresponding to the direction of the primary stress exerted on the shaft member. Since the primary stress is exerted at an angle of approximately 45°, the tilting angles of the grooves 3a and 3b and the lands 4a and 4b employed in the shown embodiment are selected to be 45°. As a result, the magnetostriction at the lands 4a and 4b, which are oriented at an outermost position, is maximum in response to the torque exerted on the shaft.

Figure 2:
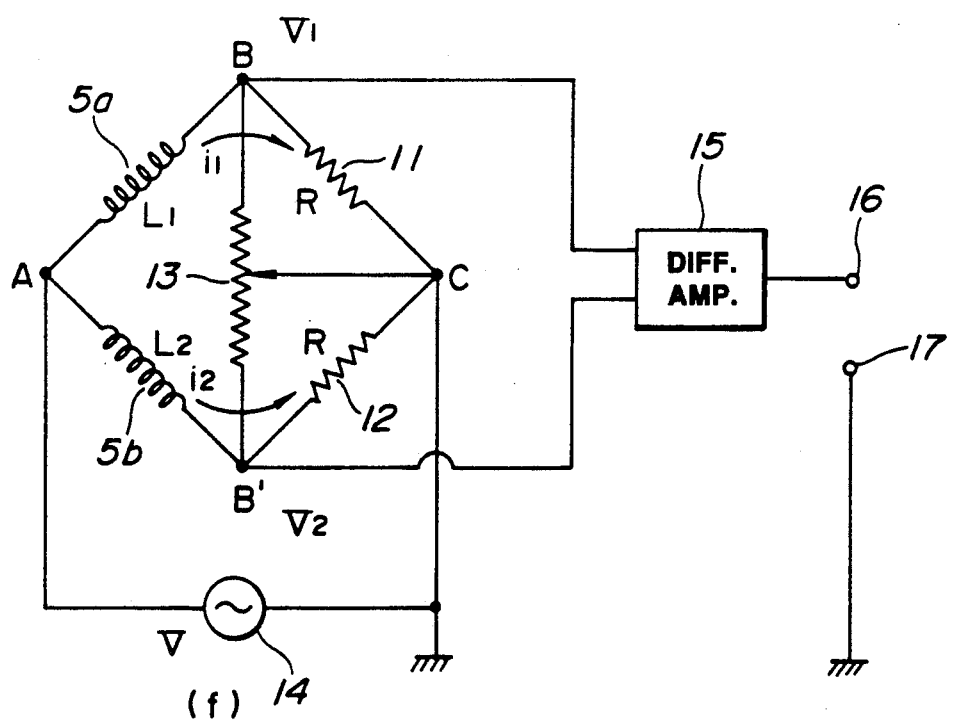
FIG. 2 is a circuit diagram of the preferred embodiment of the torque sensor of FIG. 1.

Assuming the torque T as shown in FIG. 1 is exerted on the shaft member, maximum tension stress $+\sigma$ is exerted on the lands 4a and maximum compression stress $-\sigma$ is exerted on the lands 4b. Assuming that the shaft member 2 has positive magnetostriction characteristics, permeability at the lands 4a increases according to increasing tension stress, while the permeability at the lands 4b decreases according to increasing compression stress. This causes an increase of inductance at the coil 5a and a decrease of inductance at the coil 5b. This destroys the balance in the bridge circuit of FIG. 2 so that a torque detection output corresponding to the magnitude of the exerted torque appears on the output terminals 16 and 17.

On the other hand, when a torque in the opposite direction is exerted, maximum tension stress $+\sigma$ is exerted on the lands 4b and maximum compression stress $-\sigma$ is exerted on the lands 4a. The permeability at the lands 4b increases according to increasing tension stress and the permeability at the lands 4a decreases according to increasing compression stress. This causes an increase of inductance at the coil 5b and a decrease of inductance at the coil 5a. This destroys the balance in the bridge circuit of FIG. 2 so that a torque detection output corresponding to the magnitude of the exerted torque appears on the output terminals 16 and 17.

Assuming that the inductances of the coils 5a and 5b are respectively $L_1$ and $L_2$, the resistance of both of the resistors 11 and 12 are R, the amplitude and the frequency of the alternating current power generated by the oscillator 14 are respectively v and f, the current levels $i_1$ and $i_2$, flowing through the components A-B-C and A-B'-C of the bridge circuit, respectively can be illustrated by:

$$i_1 = V/\{R^2+(2\pi fL_1)^2\}^{\frac{1}{2}}$$

$$i_2 = V/\{R^2+(2\pi fL_1)^2\}^{\frac{1}{2}}$$

From, the equations set out above, the potential $V_1$ at the junction B can be illustrated by:

$$V_1 = i_1 \times R$$

Similarly, the potential $V_2$ at the junction B' can be illustrated by:

$$V_2 = i_2 \times R.$$

Therefore, the difference of potential at the junctions B and B' can be illustrated by $|V_1 - V_2|$. This can be converted into:

$$|1/\{R^2+(2\pi fL_1)^2\}^{\frac{1}{2}} - 1/\{R^2+(2\pi fL_2)^2\}^{\frac{1}{2}}| \times R \times V.$$

By calculating the above using the differential amplifier 15, an output indicative of the torque can be obtained.

It should be appreciated that, according to the shown embodiment, by tilting the symmetrically formed grooves with opposite tilting angles, influence of the temperature variation for the permeability can be successfully canceled maintaining a constant zero torque output point. This technology is advantageously introduced in order to provide an adequately high accuracy in measurement of the torque exerted on the shaft member.

In a first embodiment, the part of the shaft member 2 serving as part of magnetic circuit or the whole of the shaft member is made of a steel which has the following composition:

C: 0.25 to 1.5 Wt %;
Si: less than or equal to 1.0 Wt %;
Mn: less than or equal to 2.0 Wt %;
Ni: less than or equal to 5.0 Wt % and/or Cr: less than or equal to 5.0 Wt %.

The content of C is preferred in the range set forth above. As will be appreciated, an adequate amount of C in the steel is necessary to provide sufficient strength for mechanical structural use, such as for axles or shafts in an automotive power train. In order to provide sufficient strength for the steel, 0.25 Wt % is a minimum content for using the steel for forming driver shaft, column shaft and so forth. On the other hand, excessive content of C will lower toughness or degrade workability in cold rolling. Therefore, a maximum content of C is set at 1.5 Wt %. In the case that the steel is subject to carburizing, the content of C is limited to be less than or equal to 0.35 Wt %, so that the C content during carburizing does not exceed 1.5 Wt %.

On the other hand, Si is used as a deoxidation agent and, in addition, as a material for reinforcing strength. However, when an excessive amount of Si is contained in the steel, it degrades toughness. Therefore, the content of Si has to be limited to be less than or equal to 1.0 Wt %. On the other hand, Mn is used as deoxidation flux and desulphurization flux. Mn is known to improve hardenability and increase strength. However, an excessive amount of Mn may cause degradation of workability. Therefore, the maximum content of Mn in the steel is set at 2.0 Wt %.

Figure 3:
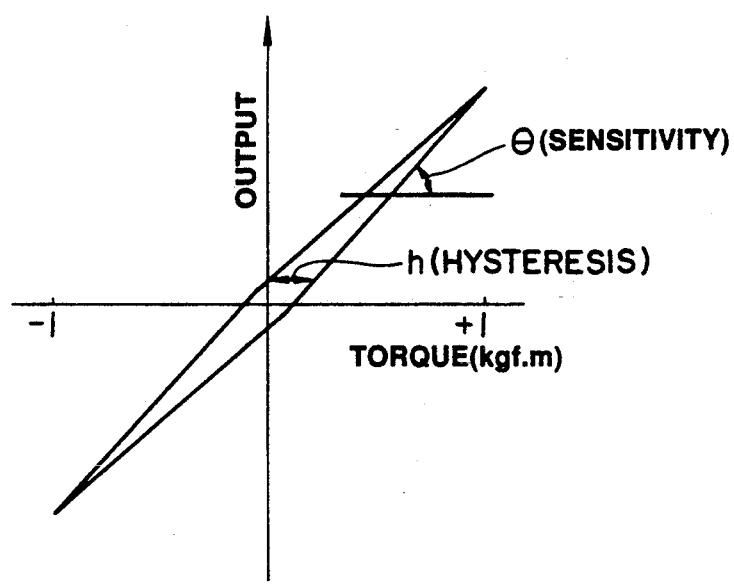
FIG. 3 is a graph showing variation of sensor output in relation to variation of a torque exerted on a shaft member.

Ni and Cr are known as materials which can improve hardenability and improve strength of the material. On the other hand, Ni has a property for influencing the sensitivity of torque variation. Namely, increasing the content of Ni will cause an increase of hysteresis which causes an increase of angle $\theta$ in FIG. 3 causing an expansion of the distance h. In order to maintain the hysteresis in an acceptable range, the content of Ni should be less than or equal to 5.0 Wt %. On the other hand, increasing the content of Cr reduces hysteresis. However, an excessive amount of Cr tends to lower the sensitivity below an acceptable level. Therefore, the maximum amount of Cr to be contained in the steel is set at 5 Wt %.

The steel for forming the shaft member may contain one or more materials selected from the following materials:

Pb: less than or equal to 0.5 Wt %;
Bi: less than or equal to 0.5 Wt %;
S: less than or equal to 0.5 Wt %;
P: less than or equal to 0.3 Wt %;
Te: less than or equal to 0.5 Wt %;
Se: less than or equal to 0.5 Wt %; and
Ca: less than or equal to 0.05 Wt %.

The materials set forth above may provide improved machinability so as to improve workability in finishing the shaft member.

The steel for forming the shaft member may further contain one or more materials selected from the following materials:

Cu: less than or equal to 1.0 Wt %;
Mo: less than or equal to 1.0 Wt %;
B: less than or equal to 0.05 Wt %;
W: less than or equal to 0.5 Wt %;
V: less than or equal to 0.5 Wt %;
Ti: less than or equal to 0.5 Wt %;
Nb: less than or equal to 0.5 Wt %;
Ta: less than or equal to 0.5 Wt %;
Zr: less than or equal to 0.5 Wt %;
Hf: less than or equal to 0.5 Wt %;
Al: less than or equal to 0.1 Wt %; and
N: less than or equal to 0.1 Wt %.

Cu and Mo are known as materials for increasing the strength of the base material of the steel. Therefore, these materials can be added if desirable. However, when an excess amount of Cu is added in the steel, it may lower hot workability. On the other hand, an excess amount of Mo may adversely influence the toughness of the steel. Therefore, the amount of Cu and Mo to be added is better to be limited in the range set forth above. B can be added for improving hardenability. Furthermore, one or more selected among W, V, Ti, Nb, Ta, Zr, Hf, Al and N may be used for obtaining fine crystals and increasing the strength of the steel by precipitation hardening.

According to the shown embodiment set forth above, experiments were performed with respect to examples 1 to 11. In order to compare the result of the examples, an additional and comparative experiment was performed with respect to a comparative example 12. The compositions of samples of the shaft member in examples 1 to 11, the comparative example 12, as well as heat treatment conditions, sensitivity and hysteresis are shown in the appended Table I.

In the experiments, the oscillator 14 was set to generate an alternating current having a frequency of 30 KHz and an amplitude of 30 mA. By exerting a torque with a magnitude of 20 Kgf.m, the sensitivity which corresponds to the rising angle $\theta$ of the line in FIG. 3 and hysteresis which corresponds to the distance h of the lines in FIG. 3 were checked in the experiments.

As will be seen from the appended Table I, the examples 1 to 11 show an adequately high sensitivity and an adequately small magnitude of hysteresis. In comparison with these examples, the comparative example exhibits substantially high sensitivity. However, in the comparative example, the magnitude of the hysteresis is unacceptably large.

In a second embodiment, the part of the shaft member 2 (serving as part of the magnetic circuit) or the whole of the shaft member is made of a steel which has the following composition:
C: 0.1 to 1.5 Wt %;
Si: less than or equal to 4.0 Wt % (when Co is not contained, more than or equal to 0.5 Wt % and less than or equal to 4.0 Wt %);
Mn: less than or equal to 3.0 Wt %;
Al: less than or equal to 3.0 Wt %;
Ni: less than or equal to 5.0 Wt % and/or Cr: less than or equal to 5.0 Wt %.

The content of C is preferred in the range set forth above. As will be appreciated, an adequate amount of C in the steel is necessary to provide sufficient strength for using as a steel for mechanical structural use, such as for axles or shafts in an automotive power train. In order to provide sufficient strength for the steel, 0.1 Wt % is a minimum content for using the steel for forming driver shaft, column shaft and so forth. On the other hand, excessive content of C will lower toughness or degrade workability in cold rolling. Therefore, a maximum content of C is set at 1.5 Wt %. In the case that the steel is subject to carburizing, content of C is to be limited to be less than or equal to 0.35 Wt % so that C content during carburizing does not exceed 1.5 Wt %.

On the other hand, Si is used for deoxidation agent and, in addition, is known as a material for reinforcing the strength. However, when an excessive amount of Si is contained in the steel, it degrades toughness. Therefore, the content of Si has to be limited to be less than or equal to 4.0 Wt %. In the case that the composition of the shaft member does not contain Co, an improvement of sensitivity is insufficient with a content less than 0.5 Wt %. Therefore, when Co is not contained, the content of Si has to be greater than or equal to 0.5 Wt %. On the other hand, Mn is used as deoxidation flux and desulphurization flux. Mn is known to improve hardenability and increase strength. However, an excessive amount of Mn may cause degradation of workability. Therefore, the maximum content of Mn in the steel is set at 3.0 Wt %. Al is effective for improving sensitivity and reducing hysteresis. Furthermore, Al is effective for making the crystal steel smaller and improves wear resistance and fatigue strength. Al is especially advantageous when nitriding treatment is performed. However, when the Al content exceeds 3.0 Wt %, it lowers the steel's toughness. Therefore, the Al content is limited to be less than or equal to 3.0 Wt %.

Co improves sensitivity. Therefore, Co can be added to the material of the shaft member. When Co is added, the content of Si can be less than 0.5 Wt % without causing a reduction in sensitivity. On the other hand, when an excess amount of Co is added, hysteresis is increased and hardenability can be lowered. Therefore, the content of Co to be added is limited to be less than or equal to 5.0 Wt %.

Ni and Cr are known as materials which can improve hardenability and improve the strength of the material. On the other hand, Ni has a property for influencing the sensitivity to torque variation. Namely, increasing the content of Ni will increase hysteresis, which will increase angle $\theta$ in FIG. 3 causing an increase in the distance h. In order to maintain the hysteresis in an acceptable range, the content of Ni is preferred to be less than or equal to 5.0 Wt %. On the other hand, increasing the content of Cr serves to reduce hysteresis. However, an excessive amount of Cr tends to lower sensitivity below an acceptable level. Therefore, the maximum amount of Cr to be contained in the steel is set at 5 Wt %.

The steel for forming the shaft member may contain one or more materials selected from the following materials:
Pb: less than or equal to 0.5 Wt %;
Bi: less than or equal to 0.5 Wt %;
S: less than or equal to 0.5 Wt %;
P: less than or equal to 0.3 Wt %;
Te: less than or equal to 0.5 Wt %;
Se: less than or equal to 0.5 Wt %; and
Ca: less than or equal to 0.05 Wt %.

The materials set forth above may provide improved machinability so as to improve workability in finishing the shaft member.

The steel for forming the shaft member may further contain one or more materials selected from the following materials:
Cu: less than or equal to 1.0 Wt %;
Mo: less than or equal to 1.0 Wt %;
B: less than or equal to 0.05 Wt %;
W: less than or equal to 0.5 Wt %;
V: less than or equal to 0.5 Wt %;
Ti: less than or equal to 0.5 Wt %;
Nb: less than or equal to 0.5 Wt %;
Ta: less than or equal to 0.5 Wt %;
Zr: less than or equal to 0.5 Wt %;
Hf: less than or equal to 0.5 Wt %; and
N: less than or equal to 0.1 Wt %.

Cu and Mo are known as materials for increasing the strength of the base material of the steel. Therefore, these materials can be added if desirable. However, when an excess amount of Cu is added in the steel, it may lower hot workability. On the other hand, an excess amount of Mo may influence the toughness of the steel. Therefore, the amount of Cu and Mo to be added is better limited to the range set forth above. B can be added for improving hardenability. Furthermore, one or more selected among W, V, Ti, Nb, Ta, Zr, Hf and N may be used to obtain fine crystal and to increase the strength of the steel by precipitation hardening.

At first, an experiment was conducted for testing the relationship between sensitivity and content of Si, and samples were formed of material steels having the following composition:
C: 0.20 Wt %
Si: 0.25-5.0 Wt %
Mn: 0.7 Wt %
Cu: 0.1 Wt %
Ni: 0.1 Wt %
Cr: 1.0 Wt %
Mo: 0.15 Wt %
Al: 0.03 Wt % The content of Si was 0.25 Wt %, 0.5 Wt %, 1.0 Wt %, 2.0 Wt %, 4.0 Wt % and 5.0 Wt %. The samples were produced by melting the material steel in a vacuum induction furnace and then forged. The samples were then formed into round bars of 20 mm diameter. The samples were provided tilted grooves 3a and 3b and the lands 4a and 4b with tilting angle of 45°. The grooves were respectively shaped to have a width of 2 mm, depth of 1 mm. Respective samples were subject to oil hardening and carburizing at 910° C. for three hours and subsequently subject to tempering at 170° C. for two hours.

Figure 4:
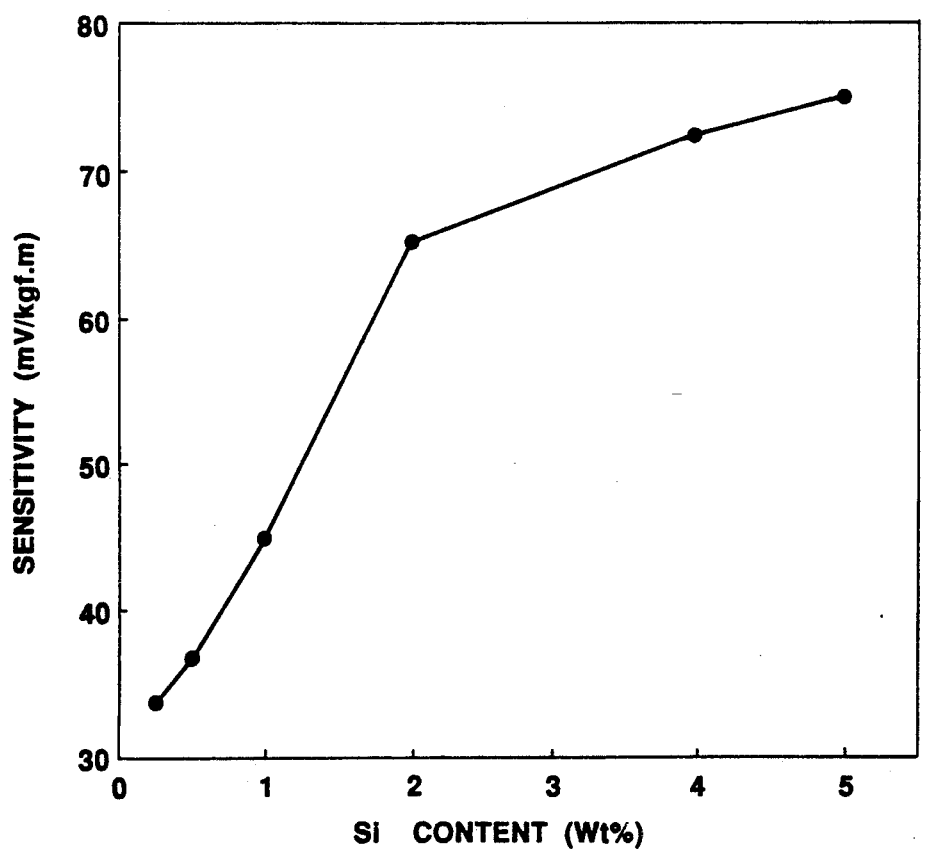
FIG. 4 is a graph showing variation of sensitivity in relation to content of Si.

For the torque sensor including the shaft member prepared as set forth above, the oscillator 14 output a signal with a frequency of 30 KHz and an amplitude of 30 mA. At this condition, torque with a magnitude of 20 Kgf.m was exerted for sensitivity testing. The result of the testing is shown in FIG. 4. As is clear from FIG. 4, sensitivity increases as the content of Si increases in the sample. However, as can be seen in FIG. 4, a substantial increase in sensitivity cannot be obtained if the Si content is greater than 4 Wt %.

According to the second embodiment set forth above, other experiments were performed with respect to examples 13 to 26. In order to compare the result of the examples, an additional comparative experiment was performed with respect to comparative examples 27 and 28. The composition of samples of the shaft member in examples 13 to 26 and the comparative examples 27 and 28, as well as the heat treatment conditions, sensitivity and hysteresis are shown in the appended Table II.

In the experiments, the oscillator 14 was set to generate alternating current having a frequency of 30 KHz and an amplitude of 30 mA. By exerting a torque with a magnitude of 20 Kgf.m, the sensitivity which corresponds to the rising angle $\theta$ of the line in FIG. 3 and the hysteresis which corresponds to the distance h of lines in FIG. 3 were checked in the experiments.

As will be seen from the appended Table II, the examples 13 to 26 show satisfactorily high sensitivity and satisfactorily small magnitude of hysteresis. In comparison with these examples, the comparative example 27 exhibits acceptably high sensitivity. However, in the comparative example 27, the magnitude of the hysteresis is unacceptably large. On the other hand, the comparative example 28 has unacceptably low sensitivity.

Further experiments were performed with respect to samples as shown in the appended Table III. In the Table III, there are shown examples 29 to 42 and comparative examples 43 and 44. As seen from Table III, the samples in the examples had various, mutually distinct compositions and were subject to various heat treatment processes. For respective samples produced according to the conditions and compositions listed in the Table III, tests were performed with the same conditions as set forth with respect to the examples 13 to 28. The sensitivity and hysteresis monitored with respect to each of the examples are shown in the Table III.

As will be appreciated from the examples in Table III, the samples which were treated by the carburizing process had a better sensitivity level and smaller hysteresis as shown in the examples 29 to 42. On the other hand, as observed with respect to the example 43 which had a Co content of 6.52 Wt % greater than the maximum acceptable content, i.e. 5 Wt %; and with respect to the example 44 which has a Ni content of 6.02 Wt % greater than the maximum acceptable content 5 Wt %, the hysteresis was unacceptably high, though these examples had high sensitivity levels.

Figure 5:
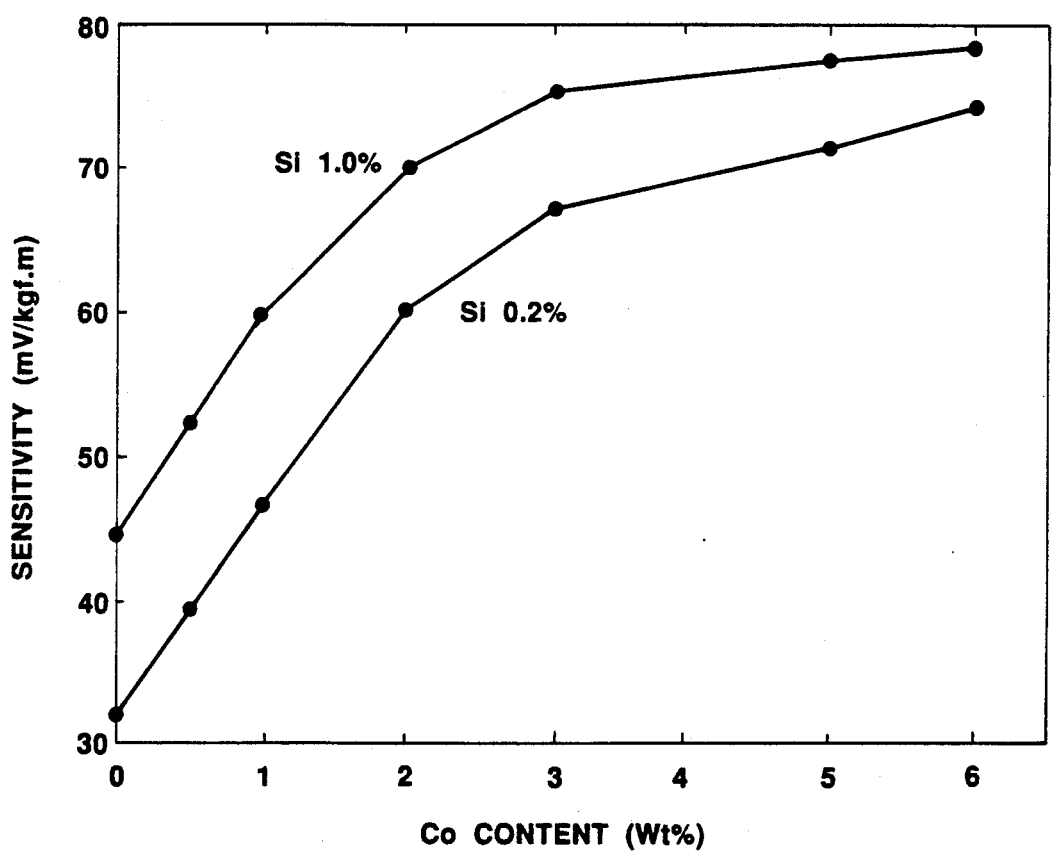
FIG. 5 is a graph showing variation of sensitivity in relation to content of Co.

On the other hand, as seen from FIG. 5, when the content of Co is increased, sufficiently high sensitivity can be obtained even when the Si content is smaller than 0.5 Wt %.

In a third embodiment, the shaft member forming part of the torque sensor according to the present invention is made of Fe-Al alloy which is provided by the following composition:
Al: 11.0 Wt % to 15 Wt %
total content 0.01 Wt % to 5.0 Wt % of one or two materials selected among B, Si, Ge, Sn, Pb, P, Sb, Cu, Ni, Co, Mn, Cr, Mo, W, V, Nb, Ta, Ti, Zr, Hf, Be, Sc, Y and other rare earth metals; and a remaining content of Fe.

Al is effective for improving sensitivity and reducing hysteresis. Furthermore, Al is effective for making the crystal steel smaller and improves wear resistance and fatigue strength. Al especially is advantageous when nitriding treatment is performed. Therefore, the content of Al is set to 11.0 Wt % at the minimum. On the other hand, when the Al content exceeds 15.0 Wt %, it causes lowering or toughness. Therefore, the Al content is limited to be less than or equal to 15.0 Wt %.

For the Fe-Al alloy set out above, C in a content of 0.01 Wt % to 0.50 Wt % can be added.

The additional one or two materials, i.e. the total content 0.01 Wt % to 5.0 Wt % of one or two materials selected among B, Si, Ge, Sn, Pb, P, Sb, Cu, Ni, Co, Mn, Cr, Mo, W, V, Nb, Ta, Ti, Zr, Hf, Be, Sc, Y and other rare earth metals, are added to serve as deoxidation flux and desulphurization flux, in order to increase strength by solid solution precipitation hardening, and to aid fine crystallization of the steel, or to improve toughness. Furthermore, C, W and Cr serve to suppress diffusion mobility or to improve malleability. On the other hand, the excess amount of these materials may cause a lowering of workability, a lowering of toughness, a lowering of sensitivity of magnetostriction component and/or an increasing of hysteresis. Therefore, the total content of these materials are selected in a range of 0.01 Wt % to 5.0 Wt %.

Experiments were performed with respect to samples having compositions as shown in the appended Table IV. The samples were produced by melting 50 Kg of Fe-Al alloy by the vacuum induction furnace, by forging and subsequent machining. The samples were subject to heat treatment according to the conditions as set forth in Table IV. The samples were provided tilted grooves 3a and 3b and lands 4a and 4b with a tilting angle of 45°. The grooves were respectively shaped to have a width of 2 mm and a depth of 1 mm.

For the torque sensor including the shaft member prepared as set forth above, the signal output by the oscillator 14 has a frequency of 30 KHz and amplitude of 30 mA. At this condition, torque with a magnitude of 20 Kgf.m was exerted for testing sensitivity. The result of the testing is shown in the Table IV. As will be clear from FIG. 4, sensitivity increases according to an increase in the content of Si in the sample. In addition, in order to test mechanical characteristics of the samples, a tensile test was performed. Results of the tensile test are also shown in Table IV.

As seen from the appended Table IV, the examples 45, 46 and 47 contain Al: 11.0 Wt % to 15 Wt %; and 0.01 Wt % to 5.0 Wt % of one or two materials selected among B, Si, Ge, Sn, Pb, P, Sb, Cu, Ni, Co, Mn, Cr, Mo, W, V, Nb, Ta, Ti, Zr, Hf, Be, Sc, Y and other rare earth metals; and the remaining content, Fe. On the other hand, the examples 48 and 49 contain 0.01 Wt % to 0.50 Wt % of C, and one or two of Cr, Mo, W, V, Nb, Ta, Ti, Zr, Hf in the total content of 0.01 to 0.05 Wt. The examples 50, 51, 52 and 53 contain one or more of the materials selected among B, Si, Ge, Sn, Pb, P, Sb, Cu, Ni, Co, Mn, Be, Sc, Y or other rare earth metals; C; and one or more of Cr, Mo, W, V, Nb, Ta, Ti, Zr, Hf. In these examples 45 to 53, the sensitivity level is 1.3 V/Kgf.m to 2.7 V/Kgf.m. This sensitivity level is much higher than that of the comparative example 57 which employs steel for mechanical structural use according to JIS S30C. In comparison with the examples 50 to 53 with the comparative example 54 which is composed of Fe and Al, it will be seen that the comparative example 54 has an acceptable level of sensitivity but lacks mechanical strength. This is good evidence that addition of the aforementioned materials will improve strength, toughness and workability.

On the other hand, as seen from the comparative examples 55 and 56, when the excess content of B, Si, Ge, Sn, Pb, P, Sb, Cu, Ni, Co, Mn, Cr, Mo, W, V, Nb, Ta, Ti, Zr, Hf, Be, Sc, Y and other rare earth metal is added, the sensitivity becomes 0.7 V/Kgf.m and 0.5 V/Kgf.m, which are not acceptable.

In a fourth embodiment, the shaft member forming part of the torque sensor according to the present invention is made of an Fe-Al alloy which contains 11.0 Wt % to 15 Wt % of Al. The Fe-Al alloy is subject to heat treatment and the alloy is cooled from a temperature higher than or equal to 500° C. at a cooling speed of 500° C./hr.

The alloy may further contain a total content 0.01 Wt % to 5.0 Wt % of one or two materials selected from among B, Si, Ge, Sn, Pb, P, Sb, Cu, Ni, Co, Mn, Cr, Mo, W, V, Nb, Ta, Ti, Zr, Hf, Be, Sc, Y and other rare earth metals.

As set forth in the former embodiment, Al is effective for improving sensitivity and reducing hysteresis. Furthermore, Al is effective for making the crystal steel smaller and improves wear resistance and fatigue strength. Al is especially advantageous when nitriding treatment is performed. Therefore, the content of Al is set at a minimum of 11.0 Wt %. On the other hand, when the Al content exceeds 15.0 Wt %, it causes a lowering of toughness. Therefore, the Al content is limited to be less than or equal to 15.0 Wt %.

The additional one or two materials, i.e. a total content 0.01 Wt % to 5.0 Wt % of one or two materials selected among B, Si, Ge, Sn, Pb, P, Sb, Cu, Ni, Co, Mn, Cr, Mo, W, V, Nb, Ta, Ti, Zr, Hf, Be, Sc, Y and other rare earth metals, are added to serve as deoxidation flux, desulphurization flux, in order to increase strength by solid solution precipitation hardening, to aid for fine crystallization of the steel, or to improve toughness. Furthermore, C, W and Cr serve to suppress diffusion mobility or to improve malleability. On the other hand, an excess amount of these materials may cause a lowering of workability, lowering of toughness, lowering of sensitivity of magnetostriction component and/or increasing of hysteresis. Therefore, the total content of these materials are selected in a range of 0.01 Wt % to 5.0 Wt %.

Experiments were performed with respect to samples having compositions as shown in the appended Table B. The samples were produced by melting 50 Kg of Fe-Al alloy using a vacuum induction furnace, then forging and subsequent machining. The samples were subject to heat treatment according to the condition as set in the Table V. The samples were provided tilted grooves 3a and 3b and the lands 4a and 4b with a tilting angle of 45°. The grooves were respectively shaped to have a width of 2 mm, and a depth of 1 mm.

For the torque sensor including the shaft member prepared as set forth above, the oscillator 14 supplied a signal with a frequency of 30 KHz and amplitude of 30 mA. At this condition, torque in a magnitude of 20 Kgf.m was exerted for testing sensitivity. The result of the testing is shown in the Table V. As will be clear from FIG. 4, the sensitivity increases according to an increase in the content of Si in the sample. In addition, in order to test mechanical characteristics of the samples, a tensile test was performed. Results of tensile test are also shown in Table V.

As seen from the appended Table V, the examples 58, 59, 60 and 61 contain Al in a range of 11.0 Wt % to 15 Wt %. For these samples, heat treatment for cooling from the temperature higher than or equal to 500° at a cooling speed 500° C./hr were performed. In this case, the examples 58, 59, 60 and 61 had sensitivities in a range of 1.5 V/Kgf.m to 3.2 V/Kgf.m, and hysteresis in a range of 0% to 7%. The obtained sensitivity and the hysteresis is generally acceptable. In comparison to this, in the case of the comparative example 69 which had Al content in the range of 11.0 Wt % to 15.0 Wt % and which was subjected to heat treatment at lower cooling speed, had an unacceptably large hysteresis. On the other hand, the comparative example 71 has an Al content of 9.5 Wt %, which is smaller than the minimum content, i.e. 11.0 Wt % but which was subjected to heat treatment satisfying the condition set forth above. However, the sensitivity was held at 1.0 V/Kgf.m which is unacceptably low and had a hysteresis of 14% which was unacceptably large. On the other hand, the comparative example 72 had an Al content of 16.5 Wt % which is greater than the acceptable maximum content, i.e. 15 Wt %. For this comparative example, heat treatment satisfying the condition set forth above was performed. However, the sensitivity was 0.9 V/Kgf.m and hysteresis was 7%. However, the comparative example 72 was not satisfactory in the sensitivity level.

On the other hand, the examples 62, 63 and 64 contain a total content 0.01 Wt % to 5.0 Wt % of one or two materials selected among B, Si, Ge, Sn, Pb, P, Sb, Cu, Ni, Co, Mn, Cr, Mo, W, V, Nb, Ta, Ti, Zr, Hf, Be, Sc, Y and other rare earth metals, and the heat treatment for cooling from a temperature higher than or equal to 500° C. at the cooling speed 500° C./hr was performed. Further, the examples 65 and 66 contain 0.01 Wt % to 0.50 Wt % of C and 0.01 to 0.05 Wt % of one or two of Cr, Mo, W, V, Nb, Ta, Ti, Zr, Hf. For examples 65 and 66, the heat treatment for cooling from a temperature higher than or equal to 500° C. at the cooling speed 500° C./hr was performed. For examples 62 to 66, the sensitivity was in a range of 1.3 V/Kgf.m to 2.7 V/Kgf.m and hysteresis was in a range of 2% to 6%.

As will be appreciated herefrom, one or more of the materials selected among B, Si, Ge, Sn, Pb, P, Sb, Cu, Ni, Co, Mn, Be, Sc, Y and other rare earth metals; C; and one or more of Cr, Mo, W, V, Nb, Ta, Ti, Zr, Hf, had sensitivity levels much higher than that of the comparative example which contains only Al. The comparative examples contain a sample, which is composed of only Fe and Al, and which has acceptable levels of sensitivity but lacks mechanical strength. This is good evidence that addition of the aforementioned materials will improve strength, toughness and workability.

When the content of one or two materials selected among B, Si, Ge, Sn, Pb, P, Sb, Cu, Ni, Co, Mn, Cr, Mo, W, V, Nb, Ta, Ti, Zr, Hf, Be, Sc, Y and other rare earth metals, is in excess of the maximum content, 5.0 Wt % as in the comparative example 57, the sensitivity was 0.7 V/Kgf.m and the hysteresis was 17%. Both values were not acceptable. When the starting temperature of cooling in the heat treatment is 400° C. which is lower than 500° C. as in the comparative example 58, the sensitivity was 0.8 V/Kgf.m which is unacceptable. Also, in this comparative example, hysteresis was also unacceptably large.

For the samples corresponding to the examples 59 and 67, output characteristics were tested by varying the cooling speed. The samples in example 59 are heated at 1100° C. for three hours and subsequently slowly cooled down to 700° C. From 700° C., the samples in the example 59 were cooled at various cooling speeds. On the other hand, the samples in the example 67 were heated at 1100° C. for three hours and subsequently cooled at various cooling speeds. The outputs of the torque sensor were monitored and illustrated in FIG. 6.

Figure 6:
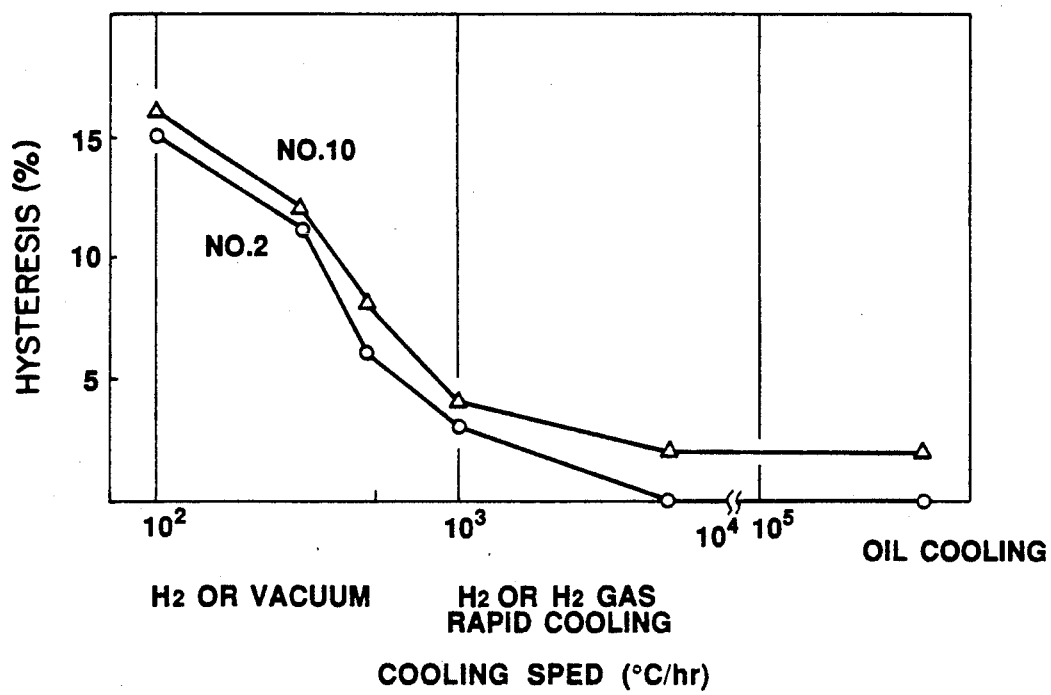
FIG. 6 is a graph showing variation of hysteresis in relation to variation of cooling speed.

As can be seen in FIG. 6, when the cooling took place in $H_2$ atmosphere or vacuum atmosphere at a cooling speed 100° C./hr and 300° C./hr, hysteresis was held higher than 10%. When cooling was taken place in $H_2$ atmosphere or in vacuum at a cooling speed 500° C./hr, 1000° C./hr, 5000° C./hr, or when oil cooling took place in vacuum, hysteresis could be held below 10%.

A fifth embodiment of the invention will now be described. In the embodiments set forth previously, the shaft member 2 has a property which satisfies one of the following conditions (A), (B) and (C):

(A) saturated magnetostriction λs (unitless) satisfies, $$0.5 \times 10^{-6} \leq |\lambda h| \leq 15 \times 10^{-6}$$

(B) ratio between saturated magnetostriction and crystalline magnetic anisotropy coefficient $K_1$ (J/m³ satisfies, $$|K_1/\lambda s| \geq 6 \times 10^8 (K/m^3);$$

an elastic limit $\tau_E$ (Kgf.mm² versus twisting stress can satisfy;

$$\tau_E \geq 20 (Kgf.mm^2)$$

0.2% yield point $\tau_{0.2}$ (Kgf.mm² to twisting stress can satisfy;

$$\tau_{0.2} \geq 40 (Kgf.mm^2)$$

and (C) a holding capacity Hc (Oe) of the magnetic force can satisfy:

$$5(Oe) \leq Hc \leq 50(Oe)$$

and/or the initial permeability $\mu_i$ is in a range of:

$$10 \leq \mu_1 \leq 100$$

and the maximum permeability $\mu_m$ is in a range of:

$$50 \leq \mu_m \leq 250$$

The saturated magnetostriction λs is variable depending upon the material of the shaft member. The sensitivity of the exerted torque rose according to an increase in the saturated magnetostriction. Therefore, it is preferable to maintain the saturated magnetostriction higher than or equal to $0.5 \times 10^{-6}$. On the other hand, when the saturated magnetostriction λs becomes in excess of $15 \times 10^{-6}$, hysteresis can increase to an unacceptable level due to a decrease of the ratio $|\lambda s/K_1|$ of the saturated magnetostriction λs versus the crystalline magnetic anisotropy coefficient $K_1$ (J/m³). Therefore, concerning the saturated magnetostriction, the condition set forth above is set.

The crystalline magnetic anisotropy coefficient $K_1$ is an indication of the magnetic anisotropy of crystalline magnetic material. The magnitude of anisotropy is variable depending upon composition of the material, crystalline structure, metrographical structure and so forth. Also, exerted stresses, i.e. twisting torque. The ratio $|\lambda s/K_1|$ of the saturated magnetostriction λs versus the crystalline magnetic anisotropy coefficient $K_1$ (J/m³) corresponds to the maximum stress which can be exerted without causing hysteresis. Therefore, when the stress exerted on the shaft member becomes greater than $|\lambda s/K_1|$, the output of the torque sensor begins to vary in a non-linear fashion causing hysteresis. For the case of a drive shaft in the automotive power train, a large torque may be exerted thereto. Therefore, in view of the possible magnitude of the torque to be exerted, it is preferred to set the value of $|\lambda s/K_1|$ to be greater than or equal to $6 \times 10^8$ (J/m³).

On the other hand, even when the exerted stress is smaller than or equal to the $|\lambda s/K_1|$ value, plastic deformation may be induced in the shaft member, such as a drive shaft, when a substantially large torque is exerted, if the elastic limit $\tau_E$ (Kgf.mm² of the material steel is small. This plastic deformation of the shaft member may cause hysteresis. In order to avoid this, it is preferred to set the elastic limit $\tau_E$ at a value greater than or equal to 20 Kgf.mm². Otherwise, the 0.2% yield point versus twisting stress is greater than or equal to 40 Kgf.mm².

In order to test the performance of the shown embodiment, experiments were performed. The experiments were performed with respect to a shaft member made of a steel containing Fe as a primary component, and C, Si, Mn, Ni, Cr and/or Mo. In production, the composite material of 50 Kg was molten in the vacuum induction furnace. The samples were subsequently treated by forging, normalizing and machining. Then, hardening and tempering were performed in various conditions as shown in the appended Table VI. The samples were provided tilted grooves 3a and 3b and the lands 4a and 4b with tilting angle of 45°. The grooves were respectively shaped to have a width of 2 mm and a depth of 1 mm.

For the torque sensor including the shaft member prepared as set forth above, the oscillator 14 supplied a signal with a frequency of 30 KHz and an amplitude of 100 mA. At these conditions, torque with a magnitude of 30 Kgf.m was exerted for testing sensitivity.

A test was performed to monitor magnetic characteristics, mechanical characteristics and saturated magnetostriction $\lambda s$. The magnetostriction $\lambda s$ was measured by a strain gauge. Also, the crystalline magnetic anisotropy coefficient $K_1$ was monitored using a torque method. Magnet keeping capacity Hc, initial permeability $\mu_i$ and maximum permeability $\mu_m$ were read from B-H curves utilizing a magnetic ring test piece. The initial permeability $\mu_i$ was derived when a permeability at magnetic field H is 5(Oe). Twisting stress was measured by attaching a strain gauge and producing a shearing stress-strain curve. The point where the shearing stress-strain curve deviates from a straight line is read as the elastic limit $\tau_E$. The point where permanent deformation of 0.2% occurs is regarded as shearing stress $\tau_{0.2}$.

Here, as seen from Table VI, the examples 75 to 80 had hysteresis smaller than 10%. The comparative example 81, has saturated magnetostriction $|\lambda s| > 15 \times 10^{-6}$, the ratio of the saturated magnetostriction $\lambda s$ versus the crystalline magnetic anisotropy coefficient $K_1$ of $|K_1/\lambda s| < 6 \times 10^{-8}$ (J/m³), an Hc less than 5 (Oe), initial permeability greater than 100 and a maximum permeability greater than 250. Yet in this case hysteresis becomes 20% though high sensitivity is obtained. The comparative example 82, which has saturated magnetostriction $|\lambda s| < 0.5 \times 10^{-6}$, the elastic limit $\tau_E$ less than 20 Kgf.mm², 0.2 yield point $\tau_{0.2}$ less than 40 Kgf.mm², Hc less than 5 (Oe), initial permeability greater than 100 and maximum permeability greater than 250, yet in this case hysteresis becomes 15% and the sensitivity is unacceptably low.

Figure 7A:
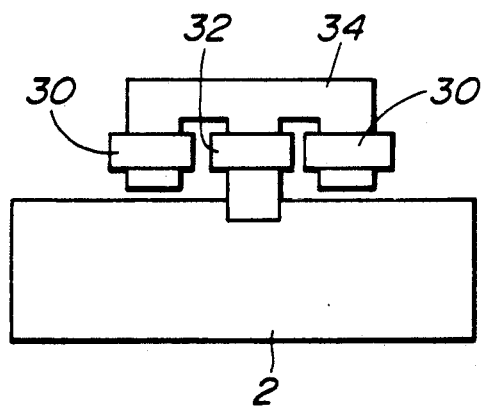
FIGS. 7(a) and 7(b) show alternative construction of the torque sensor assembly for which the preferred compositions of shaft members are applicable.
Figure 7B:
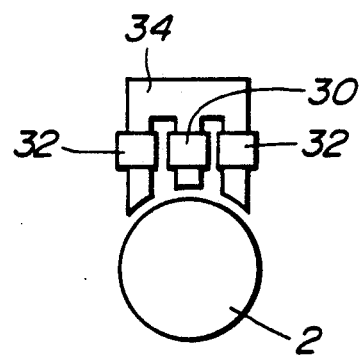

Though the shown embodiment employs electromagnetic coils serving as both of the energization coil and detector coil, the present invention is applicable for the torque sensor which has dedicated coils for energization and detection as that in the prior art. FIGS. 7(a) and 7(b) show typical examples of the torque sensor assemblies having dedicated energization coils 30 and detector coils 32 both are wound around a common yoke 34. For these examples, the preferred compositions and process conditions according to the preferred embodiments set forth above, are applicable for improved sensitivity and smaller hysteresis.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

TABLE I

| SAMPLE No. | Chemical Composition (Wt %) | | | | | | | | Heat Treatment | Sensitivity (mv/Kgf·m) | Hysteresis (%) |
|---|---|---|---|---|---|---|---|---|---|---|---|
| | C | Si | Mn | Ni | Cr | Cu | Mo | Others | | | |
| INVENTION | | | | | | | | | | | |
| Example 1 | 0.30 | 0.30 | 0.70 | 0.51 | 2.00 | — | — | — | Heating at 850° C. Subsequent Oil Hardening Tempering 550° C. × 2 hr | 60 | 4 |
| Example 2 | 0.31 | 0.50 | 0.80 | 1.50 | 0.80 | 0.11 | 0.17 | — | Heating at 850° C. Subsequent Oil Hardening Tempering 550° C. × 2 hr | 76 | 5 |
| Example 3 | 0.35 | 0.25 | 1.00 | 0.81 | 2.50 | — | — | B: 0.002 | Heating at 850° C. Subsequent Oil Hardening Tempering 550° C. × 2 hr | 58 | 3 |
| Example 4 | 0.41 | 0.35 | 0.80 | 2.48 | 0.50 | 0.08 | — | Nb: 0.15 Ti: 0.05 | Heating at 900° C. Subsequent Oil Hardening Tempering 600° C. × 2 hr | 90 | 5 |
| Example 5 | 0.46 | 0.25 | 0.75 | 1.00 | 0.99 | — | — | Al: 0.03 N: 0.01 | Heating at 900° C. Subsequent Oil Hardening Tempering 600° C. × 2 hr | 58 | 4 |
| Example 6 | 0.31 | 0.26 | 0.69 | 0.51 | 1.52 | — | 0.18 | Pb: 0.16 Te: 0.035 | High Frequency Hardening Tempering 170° C. × 2 hr | 65 | 2 |
| Example 7 | 0.40 | 0.25 | 0.71 | 1.48 | 0.98 | — | 0.20 | Al: 0.01 N: 0.02 | High Frequency Hardening Tempering 150° C. × 2 hr | 74 | 4 |
| Example 8 | 0.45 | 0.31 | 0.75 | 2.51 | 0.51 | 0.10 | — | Ti: 0.03 | High Frequency Hardening Tempering 150° C. × 2 hr | 73 | 5 |
| Example 9 | 0.43 | 0.30 | 0.80 | 0.53 | 1.89 | — | 0.17 | — | Heating at 880° C. Subsequent Oil Hardening Tempering 500° C. × 2 hr | 50 | 3 |
| Example 10 | 0.78 | 0.28 | 0.70 | 0.35 | 2.51 | 0.13 | 0.17 | Ta: 0.08 | Heating at 900° C. Subsequent Oil Hardening Tempering 170° C. × 2 hr | 30 | 2 |
| Example 11 | 0.83 | 0.25 | 0.79 | 3.20 | 0.51 | 0.07 | — | — | Heating at 900° C. Subsequent Oil Hardening Tempering 170° C. × 2 hr | 61 | 7 |
| COMPARATIVE Example 12 | 0.41 | 0.75 | 0.80 | 5.53 | 1.05 | 0.08 | — | — | Heating at 850° C. Subsequent Oil Hardening Tempering 550° C. × 2 hr | 150 | 19 |

TABLE II

| SAMPLE No. | C | Si | Mn | Al | Ni | Cr | Cu | Mo | Others | Heat Treatment | Sensitivity (mv/Kgf · m) | Hysteresis (%) |
|---|---|---|---|---|---|---|---|---|---|---|---|---|
| INVENTION | | | | | | | | | | | | |
| Example 13 | 0.20 | 0.75 | 0.75 | 0.02 | 2.01 | 1.03 | — | — | — | Carburizing 910° C. × 3 hr Subsequent Oil Hardening Tempering 170° C. × 2 hr | 63 | 3 |
| Example 14 | 0.18 | 1.01 | 0.80 | 0.03 | 0.09 | 2.02 | — | — | — | Carburizing 910° C. × 3 hr Subsequent Oil Hardening Tempering 170° C. × 2 hr | 42 | 0 |
| Example 15 | 0.22 | 1.03 | 1.04 | 0.04 | 1.03 | 1.51 | 0.08 | — | Ti: 0.03 | Carburizing 910° C. × 3 Subsequent Oil Hardening Tempering 170° C. × 2 hr | 51 | 2 |
| Example 16 | 0.20 | 1.98 | 0.50 | 0.03 | 1.52 | 2.48 | — | 0.35 | N: 0.01 | Carburizing 900° C. × 3 Subsequent Oil Hardening Tempering 170° C. × 2 hr | 70 | 4 |
| Example 17 | 0.25 | 0.85 | 0.10 | 0.10 | 0.25 | 3.01 | — | — | Pb: 0.20 | Heating at 900° C. Subsequent Oil Hardening Tempering 170° C. × 2 hr | 96 | 7 |
| Example 18 | 0.35 | 0.75 | 0.70 | 0.31 | 0.48 | 1.51 | — | 0.16 | — | Heating at 850° C. Subsequent Oil Hardening Tempering 500° C. × 2 hr | 80 | 4 |
| Example 19 | 0.36 | 0.75 | 0.70 | 0.06 | 0.10 | 3.52 | 0.09 | — | Ti: 0.10 Nb: 0.05 | Heating at 850° C. Subsequent Oil Hardening Tempering 500° C. × 2 hr | 75 | 4 |
| Example 20 | 0.40 | 1.53 | 0.25 | 0.01 | 3.02 | 0.35 | — | 0.15 | S: 0.10 Te: 0.030 | Heating at 850° C. Subsequent Oil Hardening Tempering 500° C. × 2 hr | 104 | 7 |
| Example 21 | 0.42 | 1.02 | 0.81 | 0.02 | 2.51 | 0.48 | 0.13 | — | N: 0.01 | High Frequency Hardening Tempering 170° C. × 2 hr | 89 | 6 |
| Example 22 | 0.46 | 2.51 | 0.75 | 0.02 | 0.12 | 2.51 | — | — | B: 0.005 | High Frequency Hardening Tempering 170° C. × 2 hr | 95 | 5 |
| Example 23 | 0.30 | 0.80 | 0.81 | 1.01 | 0.26 | 2.00 | — | 0.17 | — | Gas Nitriding 550° C. × 50 hr | 86 | 6 |
| Example 24 | 0.41 | 1.48 | 0.45 | 0.12 | 0.51 | 2.48 | 0.07 | 0.20 | V: 0.21 | Gas Nitriding 550° C. × 50 hr | 78 | 5 |
| Example 25 | 0.75 | 0.99 | 0.45 | 0.15 | 0.47 | 2.98 | — | — | — | Heating at 900° C. Subsequent Oil Hardening Tempering 170° C. × 2 hr | 42 | 3 |
| Example 26 | 0.81 | 1.49 | 2.02 | 0.07 | 0.12 | 0.52 | — | 0.16 | Ta: 0.09 | Heating at 900° C. Subsequent Oil Hardening Tempering 170° C. × 2 hr | 58 | 4 |
| COMPARATIVE | | | | | | | | | | | | |
| Example 27 | 0.20 | 0.98 | 0.65 | — | 5.48 | 1.00 | — | — | — | Carburizing at 910° C. 3 hr Tempering 170° C. × 2 hr | 75 | 4 |
| Example 28 | 0.18 | 0.11 | 0.78 | — | 0.10 | 2.00 | — | 0.18 | — | Carburizing at 910° C. 3 hr Tempering 170° C. × 2 hr | 104 | 7 |

TABLE III

| SAMPLE No. | C | Si | Mn | Al | Ni | Cr | Cu | Co | Others | Heat Treatment | Sensitivity (mv/Kgf · m) | Hysteresis (%) |
|---|---|---|---|---|---|---|---|---|---|---|---|---|
| INVENTION | | | | | | | | | | | | |
| Example 29 | 0.21 | 0.25 | 0.76 | 0.02 | 2.02 | 0.98 | — | 0.02 | — | Carburizing 910° C. × 3 hr Subsequent Oil Hardening Tempering 170° C. × 2 hr | 58 | 2 |
| Example 30 | 0.17 | 1.75 | 0.25 | 0.04 | 2.48 | 1.48 | 0.08 | 1.03 | Mo: 0.16 | Carburizing 910° C. × 3 hr Subsequent Oil Hardening Tempering 170° C. × 2 hr | 63 | 4 |
| Example 31 | 0.22 | 1.02 | 1.03 | 0.05 | 0.51 | 2.61 | — | 0.51 | Ti: 0.14 V: 0.05 | Carburizing 910° C. × 3 Subsequent Oil Hardening Tempering 170° C. × 2 hr | 57 | 1 |
| Example 32 | 0.20 | 0.30 | 0.81 | 0.03 | 0.99 | 3.03 | — | 2.05 | N: 0.01 | Carburizing 900° C. × 3 Subsequent Oil Hardening Tempering 170° C. × 2 hr | 70 | 2 |
| Example 33 | 0.25 | 1.47 | 0.15 | 0.10 | 0.98 | 2.54 | 0.11 | 1.47 | S: 0.07 | Heating at 900° C., Subsequent Water Hardening Tempering 170° C. × 2 hr | 98 | 7 |
| Example 34 | 0.34 | 0.77 | 0.78 | 0.05 | 3.02 | 0.52 | — | 0.48 | Mo: 0.21 | Heating at 850° C., Subsequent Water Hardening Tempering 500° C. × 2 hr | 103 | 5 |
| Example 35 | 0.35 | 2.00 | 0.15 | 0.03 | 0.21 | 3.00 | — | 1.52 | Pb: 0.20 | Heating at 850° C., Subsequent Water Hardening Tempering 500° C. × 2 hr | 92 | 4 |
| Example 36 | 0.40 | 0.08 | 2.51 | 0.06 | 2.54 | 0.76 | — | 3.02 | V: 0.27 Zr: 0.10 | Heating at 850° C., Subsequent Water Hardening | 111 | 6 |

TABLE III-continued

| SAMPLE No. | Chemical Composition (Wt %) | | | | | | | | | Heat Treatment | Sensitivity (mv/Kgf · m) | Hysteresis (%) |
|---|---|---|---|---|---|---|---|---|---|---|---|---|
| | C | Si | Mn | Al | Ni | Cr | Cu | Co | Others | | | |
| Example 37 | 0.43 | 1.97 | 0.51 | 0.02 | 0.56 | 2.48 | — | 0.99 | Mo: 0.18 | Tempering 500° C. × 2 hr High Frequency Hardening Tempering 170° C. × 2 hr | 84 | 5 |
| Example 38 | 0.46 | 0.35 | 1.76 | 0.04 | 1.48 | 0.52 | — | 3.52 | N: 0.02 | High Frequency Hardening Tempering 170° C. × 2 hr | 107 | 6 |
| Example 39 | 0.31 | 0.47 | 2.53 | 1.21 | 3.07 | 1.41 | 0.12 | 0.73 | Mo: 0.22 | Gas Nitriding 550° C. × 50 hr | 96 | 7 |
| Example 40 | 0.41 | 0.77 | 0.31 | 0.15 | 0.81 | 0.52 | — | 1.55 | V: 0.25 | Gas Nitriding 550° C. × 50 hr | 88 | 6 |
| Example 41 | 0.77 | 0.11 | 1.01 | 0.02 | 2.55 | 1.47 | — | 4.03 | — | Heating at 900° C., Subsequent Water Hardening Tempering 170° C. × 2 hr | 79 | 4 |
| Example 42 | 0.81 | 0.20 | 0.65 | 0.20 | 0.70 | 3.51 | — | 0.64 | Ti: 0.08 Nb: 0.07 | Heating at 900° C., Subsequent Water Hardening Tempering 170° C. × 2 hr | 48 | 3 |
| COMPARATIVE | | | | | | | | | | | | |
| Example 43 | 0.21 | 0.24 | 0.75 | — | 2.00 | 1.01 | — | 6.52 | — | Carburizing at 910° C. Subsequent Oil Hardening Tempering 170° C. × 2 hr | 109 | 14 |
| Example 44 | 0.18 | 0.22 | 0.81 | — | 6.02 | 3.01 | 0.06 | 0.45 | Mo: 0.23 Zr: 0.10 | Carburizing at 910° C. Subsequent Oil Hardening Tempering 170° C. × 2 hr | 117 | 16 |

TABLE IV

| SAMPLE No. | Chemical Composition (Wt %) | | | | | | | | | | | | | Sensitivity (V/Kgf · m) | Mechanical Strength (Tensile $\sigma_B$) (Kgf/mm$^2$) |
|---|---|---|---|---|---|---|---|---|---|---|---|---|---|---|---|
| | Al | C | Si | Cu | Ni | Co | Mn | Cr | Mo | V | Nb | Ti | Zr | | |
| Example 45 | 12.4 | — | — | — | — | — | — | 1.1 | — | — | — | — | — | 2.5 | 80 |
| Example 46 | 12.8 | — | — | — | — | — | — | — | 0.8 | — | — | — | — | 2.7 | 82 |
| Example 47 | 13.1 | — | — | — | — | 1.5 | — | — | — | — | — | — | — | 2.2 | 83 |
| Example 48 | 13.3 | 0.05 | — | — | — | — | — | — | — | 0.5 | — | — | — | 1.4 | 87 |
| Example 49 | 12.9 | 0.10 | — | — | — | — | — | — | — | — | 0.3 | — | 0.2 | 1.3 | 85 |
| Example 50 | 12.0 | 0.10 | — | — | — | 1.3 | — | — | — | — | 0.5 | — | — | 1.8 | 87 |
| Example 51 | 12.9 | 0.05 | — | — | 0.3 | — | — | 0.5 | — | — | — | 0.2 | — | 1.8 | 88 |
| Example 52 | 12.7 | 0.07 | — | — | 0.2 | — | 0.5 | — | — | — | 0.3 | — | — | 2.3 | 90 |
| Example 53 | 13.5 | 0.03 | — | 0.1 | — | 2.0 | — | 0.5 | — | — | — | — | — | 2.0 | 85 |
| Example 54 | 12.7 | — | — | — | — | — | — | — | — | — | — | — | — | 3.2 | 73 |
| Example 55 | 13.1 | — | — | — | 2.5 | 3.0 | — | — | — | 1.3 | — | — | — | 0.7 | 86 |
| Example 56 | 12.5 | 0.60 | — | — | — | — | — | 0.5 | — | 0.8 | — | — | 0.2 | 0.5 | 90 |
| Example 57 | — | 0.31 | 0.27 | — | — | — | 0.70 | Corresponding to JIS S30C | | | | | | 0.09 | 75 |

*Remaining contents are Fe and inevitable impurity.

TABLE V

| SAMPLE No. | Chemical Composition (Wt %) | | Heat Treatment | Sensor Characteristics | | Tensile Strength $\sigma_B$ (kg/mm$^2$) |
|---|---|---|---|---|---|---|
| | Al | Others | | Sensitivity (V/Kgf · m) | Hysteresis (%) | |
| INVENTION | | | | | | |
| Example 58 | 12.0 | — — — — — | Heating at 1100° C. × 3 hr and Oil Cooling (Vacuum) | 2.3 | 7 | 75 |
| Example 59 | 12.7 | — — — — — | Heating at 1100° C. × 3 hr, Slow Cooling to 700° C. and Oil Cooling (Vacuum) | 3.2 | 0 | 73 |
| Example 60 | 13.5 | — — — — — | Heating at 1100° C. × 3 hr, Slow Cooling to 700° C. and N Gas Cooling (500° C./hr) | 1.9 | 2 | 78 |
| Example 61 | 14.2 | — — — — — | Heating at 1100° C. × 3 hr and Cooling at 600° C./hr (H$_2$ Atmosphere) | 1.5 | 4 | 71 |
| Example 62 | 12.4 | Cr: 1.1 — — — — | Heating at 1100° C. × 3 hr and Oil Cooling (Vacuum) | 2.5 | 3 | 80 |
| Example 63 | 12.8 | Mo: 0.8 — — — — | Heating at 1100° C. × 3 hr, Slow Cooling to 700° C. and Oil Cooling (Vacuum) | 2.7 | 2 | 82 |
| Example 64 | 13.1 | Mn: 1.5 — — — — | Heating at 1000° C. × 3 hr, Slow Cooling to 800° C. and N Gas Cooling (500° C./hr) | 2.2 | 4 | 83 |
| Example 65 | 13.3 | V: 0.5 C: 0.05 — — — | Heating at 1100° C. × 3 hr and Cooling at 500° C./hr (H$_2$ Atmosphere) | 1.4 | 6 | 87 |

TABLE V-continued

| SAMPLE No. | Chemical Composition (Wt %) Al | Others | | | | Heat Treatment | Sensor Characteristics Sensitivity (V/Kgf·m) | Hysteresis (%) | Tensile Strength $\sigma_B$ (kg/mm²) |
|---|---|---|---|---|---|---|---|---|---|
| Example 66 | 12.9 | Nb: 0.3 | Zr: 0.2 | C: 0.1 | — | Heating at 1100° C. × 2 hr, Slow Cooling to 600° C. and N Gas Cooling (1500° C./hr) | 1.3 | 3 | 85 |
| Example 67 | 12.0 | Co: 1.3 | Nb: 0.5 | C: 0.1 | — | Heating at 1100° C. × 3 hr and Cooling at 1000° C./hr (H₂ Atmosphere) | 1.8 | 4 | 87 |
| Example 68 | 12.9 | Cr: 0.5 | Ni: 0.3 | Ti: 0.2 | C: 0.05 | Heating at 1100° C. × 3 hr, Slow Cooling to 580° C. and Oil Cooling (Vacuum) | 1.8 | 6 | 88 |
| COMPARATIVE | | | | | | | | | |
| Example 69 | 12.7 | — | — | — | — | Heating at 1100° C. × 3 hr and Cooling at 300° C./hr (Vacuum) | 2.9 | 11 | 74 |
| Example 70 | 12.9 | Nb: 0.3 | Zr: 0.2 | C: 0.1 | — | Heating at 1100° C. × 3 hr and Cooling at 200° C./hr (H₂ Atmosphere) | 1.5 | 12 | 86 |
| Example 71 | 9.5 | — | — | — | — | Heating at 1100° C. × 3 hr and Cooling at 700° C. and Oil Cooling (Vacuum) | 1.0 | 14 | 59 |
| Example 72 | 16.5 | — | — | — | — | Heating at 1000° C. × 3 hr and Cooling at 1000° C./hr (H Atmosphere) | 0.9 | 7 | 80 |
| Example 73 | 13.1 | Co: 3.0 | Ni: 2.5 | C: 1.3 | — | Heating at °1000 C. × 3 hr and Cooling at 100° C./hr (H₂ Atmosphere) | 0.7 | 18 | 86 |
| Example 74 | 13.5 | — | — | — | — | Heating at 400° C. × 5 hr and Oil Cooling (Vacuum) | 0.8 | 13 | 75 |

*Remaining contents are Fe and inevitable impurity.

TABLE VI

| SAMPLE No. | Magnetic Characteristics | | | | | Mechanical Characteristics | |
|---|---|---|---|---|---|---|---|
| | $\lambda_s$ | $|K1/\lambda_s|$ | Hc(Oe) | $\mu_i$ | $\mu_m$ | $\tau_E$ Kgf/mm² | $\tau_{0.2}$ Kgf/mm² |
| INVENTION | | | | | | | |
| Example 75 | $3 \times 10^{-6}$ | $1.3 \times 10^{10}$ | 42 | 40 | 110 | 56.7 | 90.2 |
| Example 76 | $2 \times 10^{-6}$ | $2.1 \times 10^{10}$ | 30 | 70 | 180 | 42.5 | 82.9 |
| Example 77 | $5 \times 10^{-6}$ | $7.6 \times 10^{9}$ | 45 | 30 | 100 | 50.9 | 85.2 |
| Example 78 | $8 \times 10^{-6}$ | $4.3 \times 10^{9}$ | 27 | 90 | 200 | 35.7 | 77.1 |
| Example 79 | $10 \times 10^{-6}$ | $3.8 \times 10^{9}$ | 35 | 60 | 150 | 29.5 | 68.3 |
| Example 80 | $3 \times 10^{-6}$ | $1.6 \times 10^{10}$ | 2.54 | 300 | 800 | 14.5 | 30.5 |
| COMPARATIVE | | | | | | | |
| Example 81 | $30 \times 10^{-6}$ | $2.5 \times 10^{8}$ | 0.20 | 2000 | 10500 | 32.1 | 45.0 |
| Example 82 | $<0.5 \times 10^{-6}$ | $1.5 \times 10^{9}$ | 0.04 | 1500 | 82000 | 10.2 | 18.0 |
| | | | | | | 0.030 | 0.030 |

| SAMPLE No. | Heat Treatment | Sensor Characteristics Sensitivity (mV/Kgf·m) | Hysterisis (%) |
|---|---|---|---|
| INVENTION | | | |
| Example 75 | Carburizing 910° C. × 3 hr Subsequent Oil Hardening Tempering 170° C. × 2 hr | 38 | 3 |
| Example 76 | Carburizing 910° C. × 3 hr Subsequent Oil Hardening Tempering 170° C. × 2 hr | 31 | 0 |
| Example 77 | Carburizing 910° C. × 3 Subsequent Oil Hardening Tempering 170° C. × 2 hr | 44 | 5 |
| Example 78 | Heating at 880° C. Subsequent Oil Hardening Tempering 550° C. × 2 hr | 70 | 4 |
| Example 79 | Heating at 880° C. Subsequent Oil Hardening Tempering 550° C. × 2 hr | 82 | 7 |
| Example 80 | Tempering at 900° C. | 35 | 10 |
| COMPARATIVE | | | |
| Example 81 | Heating at 1100° C. × 2 hr Subsequent Furnace Cooling | 1500 | 20 |
| Example 82 | Heating at 1100° C. × 2 hr Subsequent Furnace | 25 | 15 |

TABLE VI-continued

Cooling

We claim:
1. A torque sensor for monitoring torque exerted on a shaft member, comprising:
    means for generating magnetic flux for forming a magnetic circuit extending through a predetermined portion of said shaft member; and
    means for monitoring magnetostriction in said shaft member for producing a torque indicative signal having a value variable depending upon said magnetostriction;
    said shaft member being made of steel having, at least at said predetermined portion, a composition as follows
    C: 0.25 to 1.5 Wt %,
    Si: less than or equal to 1.0 Wt %,
    Mn: less than or equal to 2.0 Wt %,
    Ni: less than or equal to 5.0 Wt % and/or Cr: less than or equal to 5.0 Wt %;
    wherein said steel further contains, at least at said predetermined portion, one or more materials selected from the following materials
    Cu: less than or equal to 1.0 Wt %,
    Mo: less than or equal to 1.0 Wt %,
    B: less than or equal to 0.05 Wt %,
    W: less than or equal to 0.5 Wt %,
    V: less than or equal to 0.5 Wt %,
    Ti: less than or equal to 0.5 Wt %,
    Nb: less than or equal to 0.5 Wt %,
    Ta: less than or equal to 0.5 Wt %,
    Zr: less than or equal to 0.5 Wt %,
    Hf: less than or equal to 0.5 Wt %,
    Al: less than or equal to 0.1 Wt %, and
    N: less than or equal to 0.1 Wt %; and
    said steel having, at least at said predetermined portion, a remaining content of Fe and inevitable impurities.
2. A torque sensor as set forth in claim 1, wherein said steel further contains one or more materials selected from the following materials:
    Pb: less than or equal to 0.5 Wt %;
    Bi: less than or equal to 0.5 Wt %;
    S: less than or equal to 0.5 Wt %;
    P: less than or equal to 0.3 Wt %;
    Te: less than or equal to 0.5 Wt %;
    Se: less than or equal to 0.5 Wt %; and
    Ca: less than or equal to 0.05 Wt %.
3. A torque sensor for monitoring torque exerted on a shaft member, comprising:
    means for generating magnetic flux for forming a magnetic circuit extending through a predetermined portion of said shaft member
    means for monitoring magnetostriction in said shaft member for producing a torque indicative signal having a value variable depending upon said magnetostriction and
    said shaft member being made of a steel having a following composition at least at said predetermined portion,
    C: 0.1 to 1.5 Wt %
    Si: 0.5 Wt % to 4.0 Wt %
    Mn: less than or equal to 3.0 Wt %
    Al: less than or equal to 3.0 Wt %
    Ni: less than or equal to 5.0 Wt % and/or Cr: less than or equal to 5.0 Wt % and
    remaining content of Fe and inevitable impurity.
4. A torque sensor as set forth in claim 3, wherein said steel further contains one or more materials selected from the following materials:
    Pb: less than or equal to 0.5 Wt %
    Bi: less than or equal to 0.5 Wt %;
    S: less than or equal to 0.5 Wt %
    P: less than or equal to 0.3 Wt %
    Te: less than or equal to 0.5 Wt %
    Se: less than or equal to 0.5 Wt % and
    Ca: less than or equal to 0.05 Wt %.
5. A torque sensor as set forth in claim 3, wherein said steel further contains one or more materials selected from the following materials:
    Cu: less than or equal to 1.0 Wt %;
    Mo: less than or equal to 1.0 Wt %;
    B: less than or equal to 0.05 Wt %;
    W: less than or equal to 0.5 Wt %;
    V: less than or equal to 0.5 Wt %;
    Ti: less than or equal to 0.5 Wt %;
    Nb: less than or equal to 0.5 Wt %;
    Ta: less than or equal to 0.5 Wt %;
    Zr: less than or equal to 0.5 Wt %;
    Hf: less than or equal to 0.5 Wt %;
    N: less than or equal to 0.1 Wt %.
6. A torque sensor for monitoring torque exerted on a shaft member, comprising:
    means for generating magnetic flux for forming a magnetic circuit extending through a predetermined portion of said shaft member
    means for monitoring magnetostriction in said shaft member for producing a torque indicative signal having a value variable depending upon said magnetostriction and
    said shaft member being made of a steel having a following composition at least at said predetermined portion,
    C: 0.1 to 1.5 Wt %
    Si: 0.5 Wt % to 4.0 Wt %
    Mn: less than or equal to 3.0 Wt %
    Al: less than or equal to 3.0 Wt %
    Ni: less than or equal to 5.0 Wt % and/or Cr: less than or equal to 5.0 Wt % and
    remaining content of Fe and inevitable impurity, and
    further contains one or more materials selected from the following materials:
    Pb: less than or equal to 0.5 Wt %
    Bi: less than or equal to 0.5 Wt %;
    S: less than or equal to 0.5 Wt %
    P: less than or equal to 0.3 Wt %
    Te: less than or equal to 0.5 Wt %
    Se: less than or equal to 0.5 Wt % and
    Ca: less than or equal to 0.05 Wt %, and
    one or more materials selected from the following materials:
    Cu: less than or equal to 1.0 Wt %;
    Mo: less than or equal to 1.0 Wt %;
    B: less than or equal to 0.05 Wt %;
    W: less than or equal to 0.5 Wt %;
    V: less than or equal to 0.5 Wt %;
    Ti: less than or equal to 0.5 Wt %;
    Nb: less than or equal to 0.5 Wt %;
    Ta: less than or equal to 0.5 Wt %;
    Zr: less than or equal to 0.5 Wt %;

Hf: less than or equal to 0.5 Wt %;
N: less than or equal to 0.1 Wt %.

7. A torque sensor for monitoring torque exerted on a shaft member, comprising:

means for generating magnetic flux for forming a magnetic circuit extending through a predetermined portion of said shaft member;

means for monitoring magnetostriction in said shaft member for producing a torque indicative signal having a value variable depending upon said magnetostriction; and said shaft member being made of a steel having a following composition at least at said predetermined portion, C: 0.1 to 1.5 Wt %;
Si: less than or equal to 4.0 Wt %;
Mn: less than or equal to 3.0 Wt %;
Al: less than or equal to 3.0 Wt %
Co: less than or equal to 5.0 Wt %
Ni: less than or equal to 5.0 Wt % and/or Cr: less than or equal to 5.0 Wt %; and
remaining content of Fe and inevitable impurity.

8. A torque sensor as set forth in claim 7, wherein said steel further contains one or more materials selected from the following materials:

Pb: less than or equal to 0.5 Wt %;
Bi: less than or equal to 0.5 Wt %;
S: less than or equal to 0.5 Wt %;
P: less than or equal to 0.3 Wt %;
Te: less than or equal to 0.5 Wt %;
Se: less than or equal to 0.5 Wt %; and
Ca: less than or equal to 0.05 Wt %.

9. A torque sensor as set forth in claim 8, wherein said steel further contains one or more materials selected from the following materials.

Cu: less than or equal to 1.0 Wt %;
Mo: less than or equal to 1.0 Wt %;
B: less than or equal to 0.05 Wt %;
W: less than or equal to 0.5 Wt %;
V: less than or equal to 0.5 Wt %;
Ti: less than or equal to 0.5 Wt %;
Nb: less than or equal to 0.5 Wt %;
Ta: less than or equal to 0.5 Wt %;
Zr: less than or equal to 0.5 Wt %;
Hf: less than or equal to 0.5 Wt %;
N: less than or equal to 0.1 Wt %.

10. A torque sensor as set forth in claim 7, wherein said steel further contains one or more materials selected from the following materials:

Cu: less than or equal to 1.0 Wt %;
Mo: less than or equal to 1.0 Wt %;
B: less than or equal to 0.05 Wt %;
W: less than or equal to 0.5 Wt %;
V: less than or equal to 0.5 Wt %;
Ti: less than or equal to 0.5 Wt %;
Nb: less than or equal to 0.5 Wt %;
Ta: less than or equal to 0.5 Wt %;
Zr: less than or equal to 0.5 Wt %;
Hf: less than or equal to 0.5 Wt %;
N: less than or equal to 0.1 Wt %.

11. A torque sensor for monitoring torque exerted on a shaft member, comprising:

means for generating magnetic flux for forming a magnetic circuit extending through a predetermined portion of said shaft member; and means for monitoring magnetostriction in said shaft member for producing a torque indicative signal having a value variable depending upon said magnetostriction;

said shaft member being made of steel containing, at least at said predetermined portion, Al: 11.0 to 15.0 Wt %, said steel further containing, at least at said predetermined portion, a total content of 0.01 to 5.0 Wt % of one or more materials selected from B, Si, Ge, Sn, Pb, P, Sb, Cu, Ni, Co, Mn, Cr, Mo, W, V, Nb, Ta, Ti, Zr, Hf, Be, Sc, Y and other rare earth metals;

said steel having, at least at said predetermined portion, substantially a remaining content of Fe; and said steel having been subject to heat treatment for cooling from a temperature higher than or equal to 500° C. at a cooling speed higher than or equal to 500° C./hr.

12. A torque sensor as set forth in claim 11, wherein said steel further contains, at least at said predetermined portion, 0.01 to 0.50 Wt % of C.

13. A torque sensor for monitoring torque exerted on a shaft member, comprising:

means for generating magnetic flux for forming a magnetic circuit extending through a predetermined portion of said shaft member;

means for monitoring magnetostriction in said shaft member for producing a torque indicative signal having a value variable depending upon said magnetostriction; and at least said predetermined portion of said shaft member having a property satisfying one of the following conditions (A) to (C):

(A) saturated magnetostriction $\lambda s$ satisfies:

$$0.5 \times 10^{-6} \leq |\lambda s| \leq 15 \times 10^{-6}$$

(B) ratio between saturated magnetostriction and crystalline magnetic anisotropy coefficient $K_1$ (J/m$^3$) satisfies:

$$|K_1/\lambda s| \geq 6 \times 10^8 (K/m^3);$$

an elastic limit $\tau_E$ (kgf/mm$^2$) versus twisting stress can satisfy:

$$\tau_E \geq 20 (Kgf/mm^2)$$

0.2% yield point $\tau_{0.2}$ (Kgf/mm$^2$) to twisting stress can satisfy:

$$\tau_{0.2} \geq 40 (Kgf/mm^2)$$

and (C) a holding capacity Hc (Oe) of the magnetic force can satisfy:

$$5(Oe) \leq Hc \leq 50(Oe)$$

and/or the initial permeability $\mu_1$ is is a range of:

$$10 \leq \mu_1 \leq 100$$

and the maximum permeability $\mu_m$ is in a range of:

$$50 \leq \mu_m \leq 250.$$

14. A torque sensor for monitoring torque exerted on a shaft member, comprising:

means for generating magnetic flux for forming a magnetic circuit extending through a predetermined portion of said shaft member;

means for monitoring magnetostriction in said shaft member for producing a torque indicative signal having a value variable depending upon said magnetostriction; and said shaft member being made of a steel having a following composition, at least at said predetermined portion, c: less than or equal to 0.35 Wt % for said steel subject to carbonizing;
Si: less than or equal to 1.0 Wt %;
Mn: less than or equal to 2.0 Wt %;
Ni: less than or equal to 5.0 Wt % and/or Cr: less than or equal to 5.0 Wt %; and
remaining content of Fe and inevitable impurity.

* * * * *